United States Patent [19]

Tomic

[11] Patent Number: 4,749,413
[45] Date of Patent: Jun. 7, 1988

[54] PHOSPHATE CEMENT INCLUDING FLY ASH FOR HIGH-STRENGTH CONCRETE-LIKE PRODUCTS

[75] Inventor: Ernst A. Tomic, Wilmington, Del.

[73] Assignee: E. I. Du Pont de Nemours and Company, Wilmington, Del.

[21] Appl. No.: 922,766

[22] Filed: Oct. 24, 1986

Related U.S. Application Data

[63] Continuation of Ser. No. 745,646, Jun. 17, 1985, abandoned.

[51] Int. Cl.$^4$ .............................................. C04B 9/04
[52] U.S. Cl. ..................................... 106/85; 106/121; 106/DIG. 1; 501/111
[58] Field of Search ................... 501/111; 106/85, 104, 106/DIG. 1, 121

[56] References Cited

U.S. PATENT DOCUMENTS

| | | | |
|---|---|---|---|
| 3,923,534 | 12/1975 | Cassidy ........................... | 501/111 X |
| 3,960,580 | 6/1976 | Stierli et al. ..................... | 106/85 X |
| 4,152,167 | 5/1979 | Horvitz et al. ................... | 501/111 O R |
| 4,174,227 | 11/1979 | Tomic ............................. | 106/85 O R |
| 4,394,174 | 7/1983 | Tomic ............................. | 501/111 X |

FOREIGN PATENT DOCUMENTS

| | | |
|---|---|---|
| 0133733 | 6/1985 | European Pat. Off. . |
| 2853333 | 6/1980 | Fed. Rep. of Germany . |
| 1448320 | 9/1976 | United Kingdom . |

OTHER PUBLICATIONS

Chemical Abstracts (16), pp. 299–300, 126164r, Duderov, vol. 94 (1981).

*Primary Examiner*—Mark L. Bell
*Assistant Examiner*—Karl Group
*Attorney, Agent, or Firm*—James T. Corle

[57] ABSTRACT

Rapid-setting compositions based on MgO and Al(H$_2$PO$_4$)$_3$ and having at least a ten-minute working time, and thus suitable for mortars and road patching, form concrete-like products having increased compressive strength when fly ash is present. Fly ash reacts with aluminum phosphate to form a cementitious composition whose compressive strength is the cause of the strength increase observed in the MgO/Al(H$_2$PO$_4$)$_3$ reaction product.

17 Claims, No Drawings

PHOSPHATE CEMENT INCLUDING FLY ASH FOR HIGH-STRENGTH CONCRETE-LIKE PRODUCTS

This application is a continuation of Ser. No. 745,646, filed June 17, 1985, now abandoned.

BACKGROUND OF THE INVENTION

1. Field of the Invention

The present invention relates to cement products containing magnesium oxide and aluminum phosphate, and more particularly to rapid-setting compositions and high-compressive-strength concrete-like products formed therefrom.

2. Description of the Prior Art

Cements are particulate materials that set up and harden to strong, dense monolithic solids upon being mixed with a liquid and allowed to stand. Cements find utility in many areas of commerce, especially in the construction industry, where they are often used in conjunction with various aggregate materials to form such articles as concrete slabs, etc. Cements are also used for highway construction, and in highway patching operations. For highway patching, quick-setting cements, or, more specifically, quick-setting compositions formed by mixing the cements with liquids, are required so that road-closing times can be kept to a minimum. Rapid-setting compositions are also advantageous for masonry work, home repairing, making building panels and self-levelling floors, setting fence posts, etc.

U.S. Pat. No. 4,394,174 describes cement products, and rapid-setting compositions made therefrom, containing magnesium oxide and aluminum phosphate, which compositions are workable for a length of time, i.e., at least ten minutes, sufficient, for example, to allow them to be comfortably mixed, placed in a hole to be patched, spread, and trowelled. Thereafter the compositions are said to harden quickly, e.g., within one hour, at which time, for example, vehicular traffic can be allowed to pass over a patch. The required working time is achieved by proper control of the concentrations of the magnesium oxide and aluminum phosphate and the amount of inert aggregate also present, and of the surface area and particle size of the magnesium oxide in a manner such that the reaction exotherm is reached after a ten-minute interval.

The repairing or patching of cracks, holes, and spalled areas with rapid-setting phosphate cements usually is performed in weight-bearing surfaces such as highways, airfield pavements, driveways, bridgedecks, and the like. Inasmuch as the patch has to support vehicular traffic, and should be durable, the hardened product should have a high compressive strength.

SUMMARY OF THE INVENTION

The present invention provides an improvement in cement products containing magnesium oxide and aluminum phosphate, and in hardenable compositions and set products made therefrom. More specifically, the present invention provides (1) a rapid-setting composition, e.g., a mortar, having a work time of at least ten minutes and comprising a mixture of magnesium oxide, fly ash, aluminum phosphate, water, and an aggregate comprising sand or a combination of sand and gravel; and (2) a hard, concrete-like product formed by the hardening of said composition and having a compressive strength of at least about 20,000 kilopascals. The invention also provides a storable cement product for use in making the rapid-setting composition of the invention, which cement product contains magnesium oxide, fly ash, aluminum phosphate, an aggregate comprising sand, or sand and gravel, and optionally water, with the proviso that any water present is kept separate from the magnesium oxide and the fly ash. A preferred storable cement product contains an aqueous solution of aluminum phosphate packaged separately from the magnesium oxide and fly ash, i.e., in separate packages or in separate compartments of the same package. The workable, rapid-setting composition is formed when the magnesium oxide, fly ash, aluminum phosphate, water, and aggregate are brought together.

DETAILED DESCRIPTION

The cement product and rapid-setting composition of the invention contain fly ash, which is predominately an aluminium-iron silicate containing approximately 52 percent $SiO_2$, 25 percent $Al_2O_3$, and 13 percent $Fe_2O_3$. It has been found that, in cements and hardenable compositions containing a sand and gravel aggregate component, the addition of fly ash in a concentration even as low as 2 percent (based on the total weight of the composition) can increase the compressive strength of the set product significantly, and even more dramatically with higher fly ash concentrations. I have obtained experimental evidence that fly ash reacts with aluminum dihydrogen phosphate to form a cementitious composition having a respectable compressive strength in its own right, and, while I do not intend that my invention be limited by theoretical considerations, it is my belief that the unexpected advantage afforded by fly ash in the $MgO/Al(H_2PO_4)_3$ system may be traceable to the formation of an amorphous mixture of aluminum- and phosphorus-containing silicates.

As is discussed in the aforementioned U.S. Pat. No. 4,394,174, some quick-setting phosphate cements said to be useful in road patching are based upon ammonium phosphate and magnesium oxide. In the ammonium phosphate system, various measures have been resorted to in an effort to achieve an acceptable working time of the quick-setting composition, often with deleterious effects on its rate and degree of strength development after placement, an important consideration, for example, in road patching and masonry work.

U.S. Pat. Nos. 3,960,580 (Stierli et al.) and 4,152,167 (Horvitz et al.) include fly ash among the various materials stated to be useful as fillers in quick-setting cements based upon magnesium oxide and ammonium phosphate. Horvitz et al. prefer an essentially inert filler, while not ruling out completely fillers that are at least partially reactive in their ammonium phosphate system (which is how they characterize a fly ash filler). The latter type of filler is said to be useful in certain unspecified circumstances. In the magnesium oxide ammonium phosphate cements of Stierli et al., which also contain an oxy-boron compound, reduced viscosity and the need for less water are attributed to the presence of fly ash.

U.S. Pat. No. 4,174,227 described phosphate rock-bolt grouting products containing aluminum phosphate, magnesium oxide, aggregate, and water. While this is the same reaction system as is used in the products of the present invention, the surface area and concentration of the magnesium oxide used in the bolt grouting products, as well as the aggregate and water content, are such that the products harden usually in about 1–2 minutes. Such bolt-grouting products, which are not adapted for road patching, casting of panels or other objects, setting of posts, etc. because of their extremely short working time, contain sand as the preferred filler, while fly ash is included in a listing of the non-preferred fillers in U.S. Pat. No. 4,174,227.

The rapid-setting composition of this invention is comprised of a mixture of magnesium oxide, fly ash, aluminum phosphate (i.e., $Al(H_2PO_4)_3$), water, and aggregate. It is preferred to have an aggregate comprised of fine and coarse components such as sand of mixed sizes, or sand and gravel. This provides denser packing, and therefore a higher concentration of the less-expensive aggregate component. It also affords higher compressive strengths.

The aggregate content of the rapid-setting composition and the concrete-like set product is about from 40 to 90, and preferably about from 70 to 85, percent by weight, based on the total weight of the five critical components, i.e., magnesium oxide, fly ash, aluminum phosphate, water and aggregate. Some or all of the aggregate can be a part of the cement product, as it is in the storable cement product of this invention. In such a case, the rapid-setting composition is formed by combining a cement product comprising a dry mixture of MgO, fly ash, $Al(H_2PO_4)_3$, and aggregate with water (and additional aggregate if required); or by combining the separated components of a two-component cement product, i.e., (a) a mixture of MgO, fly ash, and aggregate and (b) an aqueous aluminum phosphate solution (and adding more aggregate if required). If the aggregate consists of sand and gravel, the MgO, fly ash, and sand portion of the aggregate can be incorporated into the cement product, and the gravel mixed with the product during the formation of the rapid-setting composition. Alternatively, the rapid-setting composition can be formed by combining all of the aggregate with an aggregate-free cement product.

The fly ash concentration in the rapid-setting composition is at least about 2 percent. At this level, compressive strengths well above 20,000 kPa are achieved. As is shown in Examples 1–6 which follow, the presence of fly ash in a concentration ranging about from 2 to 25 percent is beneficial in terms of compressive strength improvement, the greatest benefit being noted above about 8 percent, and especially at about 12 percent and above.

With some exceptions, the remaining components of the composition, i.e., magnesium oxide, aluminum phosphate, and water, are employed largely as described in the aforementioned U.S. Pat. No. 4,394,174, the disclosure of which is incorporated herein by reference. The type of magnesium oxide (i.e., its surface area and particle size) and the MgO, fly ash, $Al(H_2PO_4)_3$, and water concentrations (as well as the aggregate concentration) are controlled in a manner such as to assure a sufficiently long working time and the rapid development of an adequate set strength thereafter.

In particular, the surface area of the magnesium oxide particles preferably is less than about 1 $m^2/g$. Consequently, the dead-burned or fused grade, as well as the calcined form, of MgO can be used. A generally useful range of MgO average particle diameters is about from 60 to 120 micrometers. MgO having an average particle diameter near the upper end of this range is best suited for use in hot weather and in dry mix formulations to which water is to be added, the MgO concentration in such cases being in the range of about from 3 to 20 percent, and preferably about from 4 to 12 percent. MgO having an average particle diameter near the lower end of the specified range is best suited for use at temperatures of about 20° C. or below, at a concentration in the range of about from 2 to 10 percent, and preferably about from 3 to 6 percent.

The water content of the rapid-setting composition, or of the precursor cement product, is about from 5 to 20, and preferably from 6 to 13, percent by weight based on the total weight of the five critical components, i.e., magnesium oxide, fly ash, aluminum phosphate, water, and aggregate. With lesser amounts of water, the composition is too dry to produce a strong reaction product; and larger amounts deleteriously affect the compressive strength of the product. The aluminum phosphate content can range from about 5 to about 13 percent by weight.

In the following illustrative examples, parts and percentages are by weight.

EXAMPLES 1–6

Magnesium oxide was blended with a mixture of gravel, sand, and fly ash, and the blend was added to a 50 percent aqueous solution of aluminum dihydrogen phosphate, $Al(H_2PO_4)_3$, in the bowl of a 3.8-liter mixer. The solids and liquid were mixed for 3 minutes. A number of such mixes were prepared, all of which contained 3 percent MgO and 12 percent $Al(H_2PO_4)_3$ (50 percent aqueous solution).

The mixes also contained fly ash, gravel, and sand (gravel and sand being the inert aggregate components). A control mix containing 42 percent sand, 43 percent gravel, and no fly ash was also made according to the described procedure. The fly ash content of the mixes was varied, and the sand content was reduced in proportion to increases in the fly ash content.

Each fresh mix was transferred to three disposable molds which were 76 mm in diameter and 150 mm deep. The contents of the molds were hard in about 30 minutes. After standing at room temperature for 3 or 4 days, the hardened products were tested without moist curing for compressive strength according to ASTM C39-83b. This procedure involved capping the cylindrical specimens with a sulfur mortar (ASTM C617-84) to assure flat top and bottom surfaces. The specimens were then loaded at a rate of 0.34 MPa/sec. on a calibrated power-operated testing machine until they failed under the compressive forces indicated below.

The magnesium oxide used in the above-described procedure was a product which had been obtained by the dead-burning of magnesite. The product contained about 87 percent MgO, and $SiO_2$, CaO, $Fe_2O_3$, and $Al_2O_3$ as major impurities. Its surface area was about 0.2 to 0.7 square meter per gram. It had a mean diameter of 64 $\mu$m and a maximum diameter of 149 $\mu$m, with 75 percent of the particles passing through a 325-mesh screen, and 1 percent being held on a 100-mesh screen.

The fly ash contained approximately 52 percent $SiO_2$, 25 percent $Al_2O_3$, and 13 percent $Fe_2O_3$. About 74 percent of the particles passed through a 325-mesh screen. Its specific gravity was 2.46 $g/cm^3$. It complied with ASTM C618-83.

The aggregate used was a combination of fine and coarse aggregates, i.e., sand and gravel, respectively. The sand, of mixed particle sizes as specified in ASTM C-33, had the following size distribution: 95–100 percent smaller than 4.75 mm, 80–100 percent smaller than 2.36 mm, 50–85 percent smaller than 1.18 mm, 20–60 percent smaller than 600 μm, 10–30 percent smaller than 300 μm, and 2–10 percent smaller than 150 μm. The gravel was pea gravel about 3 to 6 mm in diameter.

The results of the compressive strength tests are shown in the following table:

| Example | Fly Ash (%)* | Product Age (days) | Compressive Strength** (kPa) |
|---|---|---|---|
| 1 | 2 | 3 | 24,690 |
| 2 | 4 | 3 | 25,250 |
| 3 | 8 | 3 | 29,540 |
| 4 | 12 | 4 | 37,150 |
| 5 | 16 | 3 | 36,120 |
| 6 | 25 | 4 | 33,160 |
| Control | 0 | 4 | 10,710 |

*Based on total weight of mix.
**Average of at least three tests performed on each composition.

The following experiments were performed to provide evidence that the beneficial effect of fly ash in rapid-setting compositions based on aluminum phosphate is more than likely a result of a chemical reaction between this phosphate and fly ash heretofore unrecognized in these compositions.

Experiment 1

A mixture of 11 grams of a 50 percent aqueous solution of aluminum dihydrogen phosphate and 20 grams of fly ash was stored at 80° C. for 16 hours in a tightly capped jar. By the end of this period, the initially thin slurry had changed into a cementitious solid. When the same mixture was stored at room temperature, it changed into a thick paste in three days, and was completely hard after 21 days. The fly ash used contained 51.72 percent $SiO_2$, 26.51 percent $Al_2O_3$, and 8.67 percent $Fe_2O_3$.

Because the cementitious product which formed as described above had no identifiable X-ray diffraction pattern, it is possible to speculate that amorphous complex alumino-ferric-silico-phosphates may form by a reaction between the aluminum phosphate and the silicates present in the fly ash.

Experiment 2

A 50 percent aqueous aluminum phosphate solution (35.5 parts) was mixed with 65.5 parts of fly ash (ASTM C-618-80, Class C) for 2 minutes. The resulting slurry was poured into four test cylinders 76 mm in diameter and 150 mm deep. The cylinders were stored for three days at 110° C. to accelerate aging. After 28 days the samples were subjected to the compressive strength test described in Examples 1–6 above. The measured strengths were 15,260, 14,980, 14,350 and 15,470 kPa.

These results indicate that a cementitious composition having a considerable compressive strength forms by the reaction of aluminum phosphate and fly ash, and that this composition may be responsible for the impressive strength gain encountered when fly ash is used in rapid-setting compositions based on magnesium oxide and aluminum phosphate.

Experiment 3

A rapid-setting composition containing in its filler component a sand that had been ground to approximate the particle size distribution of fly ash was made for the purpose of showing that the beneficial effect of fly ash on the compressive strength of the phosphate cement of the invention cannot be attributed to particle size per se, giving further evidence of the uniqueness of fly ash as a result of its chemical effect in the cement.

Fine, water-washed silica sand was ball-milled for about 5 weeks and then sieved. To approximate the particle size distribution of the fly ash, 77 percent of the −325 mesh, and 23 percent of the −200 mesh, fractions were combined and used in the following formulation:

3% MgO
12% $Al(H_2PO_4)_3$ (50% aqueous solution)
43% gravel
30% sand (ASTM C-33)
12% sand (ground as described above).

This composition was the same as that of Example 4, except that the ground sand was substituted for the fly ash. It was prepared and tested as described in Examples 1–6, except that two samples were tested, instead of three. The strength tests were performed after four days of storage at room temperature. The two samples averaged 18,970 kPa±ca. 1 percent.

Thus, although the presence of the ground sand resulted in some increase in the compressive strength (18,970 kPa vs. 10,710 kPa in the control product described in the Examples), the increase was far below that attained with 12 percent fly ash (Example 4) and even far below that attained with only 2 percent fly ash (Example 1).

What is claimed is:

1. In a hardened, concrete product having improved compressive strength formed by hardening of a workable composition having a work time of at least ten minutes consisting essentially of a mixture of magnesium oxide particles having a surface area of less than 1 square meter per gram, aluminum phosphate, water, and an aggregate consisting essentially of sand and/or gravel, the improvement comprising including from about 2 to 25 percent by weight of fly ash as a reactive component in said workable composition.

2. A product of claim 1 formed from a mixture consisting essentially of, by weight, about from 2 to 20 percent magnesium oxide, about from 5 to 13 percent aluminum phosphate, about from 5 to 20 percent water, and about from 40 to 85 percent aggregate, said magnesium oxide being in the form of particles which have average diameters in the range of about from 60 to 120 micrometers.

3. A product of claim 2 wherein said aggregate consists essentially of sand and gravel.

4. A product of claim 1 adherently attached to the surface of a hole or crack in a roadbed.

5. A product of claim 1 adherently attached to, and forming a bond between, the surfaces of a pair of facing construction members.

6. In a rapid-setting composition providing concrete products of improved compressive strength, said composition having a work time of at least ten minutes and consisting essentially of a mixture of magnesium oxide particles having a surface area of less than 1 square meter per gram, aluminum phosphate, water, and an aggregate consisting of sand and/or gravel, the inprovement comprising including from about 2 to 25 percent by weight of fly ash as a reactive component in said mixture.

7. A composition of claim 6 wherein said mixture consists essentially of, by weight, about from 2 to 20 percent magnesium oxide, about from 5 to 13 percent aluminum phosphate, about from 5 to 20 percent water, and about from 40 to 85 percent aggregate, said magnesium oxide being in the form of particles which have average diameters in the range of about from 60 to 120 micrometers.

8. A composition of claim 7 wherein said aggregate consists essentially of sand and gravel.

9. In a storable cement product containing (a) magnesium oxide particles having a surface area of less than 1 square meter per gram, (b) aluminum phosphate, and (c) an aggregate comprising sand and/or gravel, components (a) and (b) being selected to undergo a reaction in the presence of water to form a hard, concrete product of improved compressive strength having a work time of at least ten minutes, the improvement comprising including from about 2 to 25 percent of fly ash as a supplementary reactive component (d).

10. A cement product of claim 9 wherein said magnesium oxide is in the form of particles having average diameters in the range of about from 60 to 120 micrometers, components (a), (b), (c), and (d) being adapted to be combined with water in amounts such as to form a mixture therewith consisting essentially of, by weight, about from 2 to 20 percent of component (a), about from 5 to 13 percent of component (b), about from 40 to 85 percent of component (c), and about from 5 to 20 percent water.

11. A cement product of claim 10 containing said water as a component which is separated from said magnesium oxide, said reaction between components (a) and (b) being adapted to occur when they are combined with said water.

12. A cement product of claim 11 wherein said aluminum phosphate is present in aqueous solution.

13. A cement product of claim 12 consisting essentially of, by weight, about from 3 to 12 percent magnesium oxide, and, about from 5 to 13 percent water.

14. A cement product of claim 12 wherein said magnesium oxide and said aluminum phosphate solution are separately packaged.

15. A cement product of claim 9 wherein said aggregate consists essentially of sand and gravel.

16. A cement product of claim 9 in the form of a dry mix of magnesium oxide, fly ash, aluminum phosphate, and aggregate, said reaction between components (a) and (b), and a reaction between components (d) and (b), being adapted to occur when said product is combined with said water.

17. A cement product of claim 16 consisting essentially of about from 3 to 20 percent magnesium oxide, about from 5 to 13 percent aluminum phosphate, and about from 40 to 85 percent aggregate, all by weight.

* * * * *